(12) United States Patent
Ramzan et al.

(10) Patent No.: US 7,730,319 B2
(45) Date of Patent: Jun. 1, 2010

(54) PROVISIONAL SIGNATURE SCHEMES

(75) Inventors: Zulfikar Ramzan, San Mateo, CA (US); Craig Gentry, Mountain View, CA (US); David Molnar, Berkeley, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1311 days.

(21) Appl. No.: 11/215,550

(22) Filed: Aug. 29, 2005

(65) Prior Publication Data

US 2006/0056621 A1    Mar. 16, 2006

Related U.S. Application Data

(60) Provisional application No. 60/605,206, filed on Aug. 27, 2004.

(51) Int. Cl.
*H04L 9/28* (2006.01)

(52) U.S. Cl. .................. 713/180; 713/168; 713/176; 380/28

(58) Field of Classification Search .............. 380/28; 713/180, 168
See application file for complete search history.

(56) References Cited

U.S. PATENT DOCUMENTS

| | | | |
|---|---|---|---|
| 5,016,274 A | 5/1991 | Micali et al. | |
| 5,373,558 A | 12/1994 | Chaum | |
| 5,493,614 A | 2/1996 | Chaum | |
| 5,521,980 A * | 5/1996 | Brands | 380/30 |
| 6,108,783 A | 8/2000 | Krawczyk et al. | |
| 6,292,897 B1 * | 9/2001 | Gennaro et al. | 713/175 |

FOREIGN PATENT DOCUMENTS

WO    WO 03/077470    9/2003

OTHER PUBLICATIONS

"Transformation of Digital Signature Schemes into Designated Confirmer Signature Schemes" by Goldwasser and Waisbard, Springer-Verlag Berlin Heidelberg, pp. 77-100, Mar. 2004.*
N. Asokan, G. Tsudik, and M. Waidner; "Server-Supported Signatures"; Jouranl of Computer Security; vol. 1 of Fall 1997.*
International Search Report, Feb. 2, 2006, 4 pages.
Written Opinion of the International Searching Authority, 5 pages.
Asokan, N. et al. "Server-Supported Signatures", Sep. 1996. Proceedings of the European Symposium on Research of Computer Security. pp. 130-143. XP-000972234.

(Continued)

*Primary Examiner*—Edan Orgad
*Assistant Examiner*—Yin-Chen Shaw
(74) *Attorney, Agent, or Firm*—Blakely, Sokoloff, Taylor & Zafman LLP

(57) ABSTRACT

A method and apparatus for implementing portions of a provisional signature scheme are disclosed. In one embodiment, the method comprises creating a provisional signature by performing an operation on a message and completing the provisional signature to create a final signature on the message. Such a scheme may be used for server assisted signature schemes, designated confirmer signature schemes and blind signature schemes.

7 Claims, 10 Drawing Sheets

OTHER PUBLICATIONS

Roberto Di Pietro. "Secure and Efficient Authentication Scheme Using Chameleonic Functions", Mar. 2004. https://web-minds.consorzio-cini.it/servizi/intranet/buro/does/cham.pdf. XP-002365589.

PCT Written Opinion for PCT Appln No. US 2005/030850, mailed Mar. 8, 2007 (7 pages).

Jakobsson et al., "Secure Server-Aided Signature Generation", International Workshop on Practice and Theory in Public Key Cryptography, 2001, pp. 383-401.

Nguyen et al., "The Beguin-Quisquater Server-Aided RSA Protocol fromCrypto ' 95 is not Secure", Asiacrypt 1998, 8 Pages.

Beguin et al., "Fast Server-aided RSA Signatures Secure Against Active Attacks" Crypto 1995, 13 Pages.

Boneh et al., "Short Signatures from the Weil Pairing", Asiacrypt 2001, 20 Pages.

Shamir et al., "Improved Online/Offline Signature Schemes", Crypto 2001, pp. 355-367.

Bicakci et al., "Server Assisted Signatures Revisited", RSA Cryptographers' Track 2003, pp. 143-156.

Golwasser et al., "Transformation of Digital Signature Schemes into Designated Confirmer Signature Schemes", Theory of Cryptography Conference, 2004, pp. 77-100.

Goyal, "More Efficient Server Assisted One Time Signatures", Cryptography eprint archive, 2004, 9 Pages.

Krawczyk et al., "Chameleon Hashing and Signatures", NDSS 1997, 22 Pages.

Chaum, "Designated Confirmer Signatures", Eurocrypt 1994, 6 Pages.

Okamoto, "Designated Confirmer Signatures and Public-Key Encryption are Equivalent", Crypto 1994, 14 Pages.

\* cited by examiner

1101 — The designated confirmer performs a zero-knowledge proof of knowledge of a value r such that comm = (C(M,r))

Figure 11

1201 — Parse the purported signature as $(M, S, E_{PK_{dc}}(r))$

1202 — Decrypt $E_{PK_{dc}}(r)$ to recover r

1203 — The designated confirmer performs a zero-knowledge proof of knowledge of an r and an Mi such that Ver(S) = 1, C(M',r) = S, $D_{ch}(E_{ch}(r)) = r$ and M' = M

Figure 12

1301 — The designated confirmer decrypts $E_{PK}(r)$ to obtain r

1302 — The designated confirmer outputs (M,r,S) as the final signature on M

Figure 13

PROVISIONAL SIGNATURE SCHEMES

PRIORITY

The present patent application claims priority to the corresponding provisional patent application Ser. No. 60/605,206, entitled "Method and Apparatus for Provisional Signature Schemes, Including Server-Assisted, Designated Confirmer, and Blind Signature Schemes," filed on Aug. 27, 2004.

FIELD OF THE INVENTION

The present invention relates to the field of cryptography; more particularly, the present invention relates to provisional signature schemes, including provisional signatures to construct server assisted digital signatures, designated confirmer signatures, and blind signature schemes.

BACKGROUND OF THE INVENTION

In the area of general digital signatures, the most common signature schemes are RSA and the U.S. Digital Signature Algorithm over elliptic curves (ECDSA). The RSA algorithm, with appropriate parameters, can be quite fast at verification, but generating signatures is slow. Further, signatures in RSA are at least one kilobyte in size, making them unsuited for SIM cards or for product registration.

A scheme for "online/offline" digital signatures was proposed by Shamir and Tauman. See A. Shamir & Y. Tauman, "Improved Online-Offine Signature Schemes," CRYPTO 2001. Their scheme made use of chameleon hash functions and introduced the "Hash-Sign-Switch" paradigm that may be used for efficient generation of provisional signatures. They did not, however, consider the application of their scheme to the case of having a server assist in the process.

In server assisted digital signatures, it is desirable to reduce the computational and communication overhead required for a signature by employing a separate server. This is known as Server Assisted Signatures (SAS). Naturally, one can imagine a number of alternate scenarios wherein efficient digital signatures are desired and some third party is available. The issue of reducing signer communication and computation is of immediate practical interest because it allows for more efficient energy usage and, therefore, longer lifetime for mobile devices. Many previously proposed SAS schemes have been found insecure, while others require the signer to communicate a large amount of data per signature or require the server to store a large amount of state per client.

An example application for SAS is product registration. A signer may wish to dispense an authorization key for a piece of software or for a newly purchased phone. The verifier comprises the software itself, which is assumed to have connectivity to the server. The authorization key consists of a signature on the software itself plus a serial number. The digital signature is further typed on a piece of paper or a label shipped with the software.

Another example application for SAS is UIM cards. A UIM card is a smart card containing a processor and a small amount of storage. UIM cards allow the user to maintain a single identity when moving from device to device, such as from one phone to another or from a phone to a PC. In addition, UIM cards are used in FirstPass SSL client authentication, which uses RSA to authenticate a user to a web site. Current UIM cards require special purpose processors to perform RSA digital signatures and may take up to half a second for each signature. Furthermore, an RSA secret key takes one kilobyte of space on the UIM card, and so the number of keys on the card is limited to five.

Previous solutions to the server-assisted signature problem have several drawbacks. A scheme by Beguin and Quisquater was shown to be insecure by Nguyen and Stem. Therefore, it cannot be considered for practical use. For more information, see P. Nguyen and J. Stem, "The Beguin-Quisquater Server-Aided RSA Protocol from Crypto'95 is not Secure," Asiacrypt 1998 and P. Beguin and J. J. Quisquater, "Fast server-aided RSA signatures secure against active attacks," CRYPTO 1995. A method by Jakobsson and Wetzel appears secure, but is limited to use for only DSA and ECDSA, because signatures are at least 320 bits in size. See M. Jakobsson and S. Wetzel, "Secure Server-Aided Signature Generation," International Workshop on Practice and Theory in Public Key Cryptography, 2001.

A scheme by Bicacki and Bayal requires the server to store five kilobytes per signer per signature. See Bicacki & Bayal, "Server Assisted Signatures Revisited," RSA Cryptographers' Track 2003. If there were, for example, 80 million signers, each of whom produce 10 signatures per day, this requires storing roughly 3.7 terabytes per day. The scheme of Goyal addresses this problem and requires 480 bits of server storage per signature. See, V. Goyal, "More Efficient Server Assisted Signatures," Cryptography Eprint Archive, 2004. With 80 million signers, 10 signatures per day, this scheme requires roughly 357 gigabytes per day.

Worse, in both schemes, the amount of data the server must store increases without bound. This is because the data is kept in case the server is accused of cheating by some signer. Therefore, the data must be kept until the server is sure it cannot be accused of cheating, which in practice may be months or years. Assuming a "statute of limitations" period of one year, Goyal's scheme requires more than 127 terabytes of server storage. If any data is missing and a signature is challenged, the server will be unable to prove it acted correctly.

Another drawback of both the Goyal and the Bicacki-Bayal schemes is that the signer must send a public key for a one-time signature to the server for each message. With the suggested embodiment of Goyal's paper, this requires 26 kilobytes of communication per signature. This large communication makes the product registration application infeasible.

Another type of signature is a designated confirmer signature. In designated confirmer digital signatures, a signature on a message cannot be verified without the assistance of a special "designated confirmer." The signer selects the designated confirmer when the signature is generated. The designated confirmer can then take a signature and either confirm that the signature is genuine, or disavow a signature that was not actually created by the signer, but the confirmer cannot generate any new signatures. Further, the confirmer can convert a signature into a regular signature that can be verified by anyone.

An example application of using a designated confirmer is the signing of electronic contracts. A job candidate and a potential employer may negotiate an employment contract without being physically present in the same room. The employer would prefer that the employee not use the contract as a bargaining tool with other prospective employers. Therefore, the employer can sign using a designated confirmer signature and designate a court of law as the confirmer. That way, if a dispute arises, the signature can be verified, but the signature cannot be verified in the meantime by other employers. After both parties have finalized the contract, the signature can be converted to a regular signature.

Another example application for use of a designated confirmer is the verification of software patches. A software vendor may wish to restrict software patches only to users who have properly paid for software. One method of accomplishing this restriction is to sign patches with a designated confirmer signature scheme and provide confirmation only to registered users. Unregistered users cannot verify the signature and run the risk of installing compromised software patches.

Most previous implementations of designated confirmer digital signatures use special-purpose properties of algorithms such as RSA. If these specific algorithms are found insecure, then these schemes are also insecure. Goldwasser and Waisbard showed how to convert several existing signature schemes into designated confirmer signature schemes. See, S. Golwasser and E. Waisbard, "Transformation of Digital Signature Schemes into Designated Confirmer Signature Schemes," Theory of Cryptography Conference, 2004.

Another type of signature is a blind signature. In blind digital signatures, the signer signs a "blinded" version X of the message M. The blinded version X is generated with the aid of a blinding factor r. A blinder wishes to obtain a signature on a message M without revealing M to the signer. This is achieved by the blinded asking the signer to sign a message X, which is the "blinded version" of M. After signing, the signature can be "unblinded" using the blinding factor to obtain a signature on M. Without the blinding factor, it is infeasible to link a signature on the blinded message X with a signature on the un-blinded message M. From the signature on X, the blinder can then recover a signature on M. The signature on X as the "provisional signature," and the signature on M as the "final signature."

An example application of blind signatures is unlinkable electronic cash tokens. Our goal is to enhance user privacy by ensuring not even the bank can track different transactions. The user creates a token for a certain denomination and then blinds the token. The bank signs the blinded token and returns it to the user, who unblinds to obtain the bank's signature on a token. With the token and bank's signature on the token, the user can partake in a financial transaction since a third party can verify the bank's signature. On the other hand, because the bank signed the blinded token, it cannot trace the token back to the user, hence providing anonymity for the user. To avoid cheating users, a cut and choose protocol may be used in which the user generates 100 or more tokens of the same denomination and the bank asks to see 99 of them, chosen randomly, before signing the last token.

SUMMARY OF THE INVENTION

A method and apparatus for implementing portions of a provisional signature scheme are disclosed. In one embodiment, the method comprises creating a provisional signature by performing an operation on a message and completing the provisional signature to create a final signature on the message. Such a scheme may be used for server assisted signature schemes, designated confirmer signature schemes and blind signature schemes.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 11 is a flow diagram of one embodiment of a process for confirmation for a designated confirmer signature scheme.

FIG. 12 is a flow diagram of one embodiment of a process for disavowal for a designated confirmer signature scheme.

FIG. 13 is a flow diagram of one embodiment of a process for a designated confirmer signature scheme.

DETAILED DESCRIPTION OF THE PRESENT INVENTION

Figure 1:
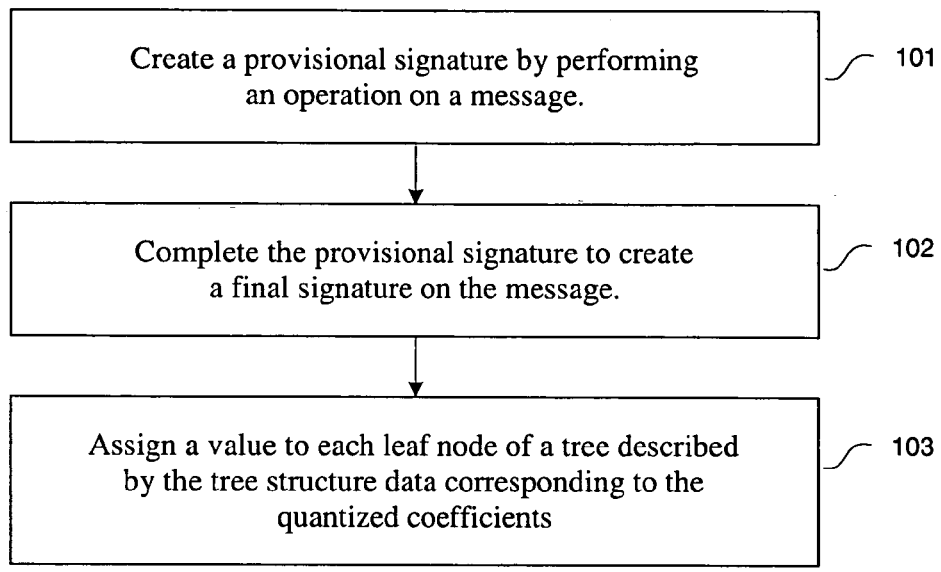
FIG. 1 is a flow diagram of one embodiment of a provisional signature process.

Provisional signature schemes are described. Specifically, the signer produces "provisional signatures" that are converted to "final signatures" by a third party server. These final signatures can then be verified by a verifier. In one embodiment, to compensate to the possibility that the third party server could be compromised or malfunctioning, the server cannot sign documents on its own but only convert provisional signatures created by the signer. In one embodiment, the server performs little computation and stores only a small amount of data per signature, so that the server may scale to handle a large number of signers.

The provisional signature schemes include server assisted signature schemes, designated confirmer signature schemes, and blind signature schemes. In one embodiment, the server assisted signatures is used in product registration and in reducing the computational load on a device. In one embodiment, the designated confirmer signature schemes are used for fair exchange of digital contracts. In one embodiment, the blind signature schemes are used to create anonymous electronic cash.

Embodiments of the present invention include schemes for secure server assisted signatures that are efficient with respect to the computation requirements of the signer, server and verifier, as well as the bandwidth requirements of the channels over which these parties communicate. In one embodiment of the present invention, the scheme has a communication complexity of the signer of only 160 bits per signature, which is an order of magnitude improvement over previous SAS schemes.

In one embodiment, the SAS method described herein for use with UIM cards requires only 128 bits of space for each secret key, and it allows fast signatures without use of special purpose co-processors.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

DEFINITIONS AND ASSUMPTIONS

For purposes herein, a function $f(n)$ is negligible if for any polynomial function $q(n)$, there is a value $n_0$ such that for all $n > n_0$, it holds that $f(n) < 1/q(n)$. One example of such a negligible function is $f(n) = 1/2^n$.

If a and b are two integers with $a \leq b$, $[a, b]$ denotes the set of integers between a and b inclusive. That is, $[a,b] = \{c \in Z | a \leq c \leq b\}$.

If S is a set of elements, and D is a sample-able probability distribution on S, the process of picking an element s from S according to the distribution D is denoted by $s \xleftarrow{D} S$.

It is known to one of ordinary skill in the art that the security of many cryptographic techniques relies upon making certain computational intractability assumptions. For example, one may try to prove that a cryptosystem is secure so long as it is difficult to decompose a specific number into its prime factors efficiently. The term "computational" is often used to identify this class of cryptographic techniques. In one embodiment, a set of assumptions relevant to proving the security of the embodiments of the present invention described herein are described below.

The Discrete Logarithm Assumption

The discrete logarithm assumption in a group G states that given a generator g of the group, and given a value $y = g^x$, it is computationally difficult to obtain x. We will be specifically interested in the group of rational points of an elliptic curve. This constitutes a standard mathematical group on which to define the discrete logarithm problem. For such an elliptic curve group of order q, the best known approaches for finding the discrete logarithm require time $\sqrt{q}$.

Chameleon Hash Function

A chameleon hash function is a function $CH(m, r)$ defined by a public key $PK_{ch}$ and a secret key $SK_{ch}$ generated by a probabilistic polynomial time algorithm $G(1^k)$. Given the public key $PK_{ch}$ it is easy to evaluate $CH(m, r)$. Without the secret key, it is hard to find a tuple $(m, m', r, r')$ such that $CH(m,$ r)=CH(m', r'). With the secret key, on the other hand, it is easy, given m, m', and r, to find an r' such that CH(m, r)=CH(m', r').

A specific family of chameleon hash functions is defined for a group G of order q in which the discrete logarithm assumption holds as follows. The secret key $SK_{ch}$ is a uniform random value x in $Z^*_q$, while the public key is the value $h=g^x$. Then defined such that CH(m, r) is CH(m, r)=$g^x h^r$. For a specific group instance, G is the group of points on an appropriately chosen elliptic curve. By appropriate choices of parameters, a chameleon hash with outputs 160 bits in length is obtained. Embodiments of the present invention described herein include the use of this chameleon hash function; however, it will be apparent to anyone with ordinary skill in the art that another chameleon hash function could be used.

Pseudo-Random Generator

A pseudo-random generator G takes as input a short random seed of s bits and outputs a string of k bits where k>s. The output string is pseudo-random in the sense of being indistinguishable from a random string.

Bit Commitment Scheme

A bit commitment scheme C(M, r) satisfies the property of being statistically hiding and computationally binding. Statistically hiding means that no adversary, no matter how powerful, can recover M from C(M, r) without knowledge of r except with negligible probability. Computationally binding means that the commitment C(M, r) cannot be opened to a value M'≠M by any probabilistic polynomial time algorithm.

Overview

FIG. 1 is a flow diagram of one embodiment of a provisional signature process. The process may be performed by processing logic that may comprise hardware (e.g., circuitry, dedicated logic, etc.), software (such as is run on a general purpose computer system or a dedicated machine), or a combination of both.

Referring to FIG. 1, the process begins by processing logic creating a provisional signature by performing an operation on a message (processing block 101). Next, processing logic completes the provisional signature to create a final signature on the message (processing block 102). Both processing blocks 101 and 102 may be performed using one or 2 secret keys. After the final signature has been completed, processing logic verifies the final signature (processing block 103).

Figure 2:
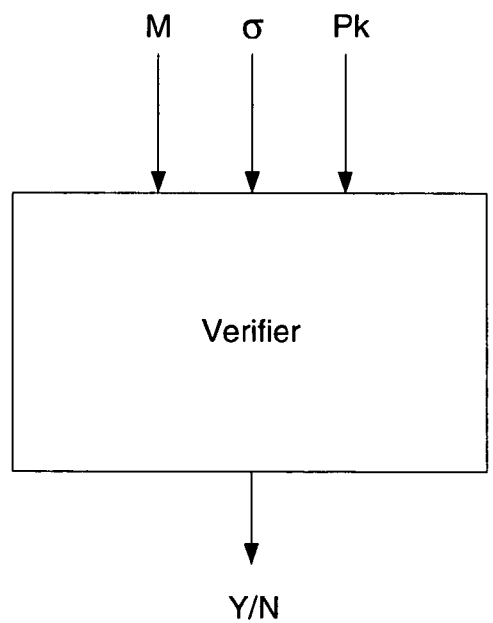
FIG. 2 is a flow diagram of one embodiment of a verifier process.

FIG. 2 is a flow diagram of one embodiment of a verifier process. Referring to FIG. 2, the signature generated through the use of the provisional signature process described herein is verified by inputting into the signature, the message m and a public key into verifier and receiving an indication (e.g., yes/no) of whether the signature is valid.

The provisional signature process described herein may be applied to server assisted signature schemes, designated confirmer schemes and blind signature schemes. Embodiments of these schemes are described below.

An Example System for Server Assisted Signatures

In one embodiment, a system for communicating data between a signer, verifier, and server provides server assisted signatures. The signer generates provisional signatures and transmits the generated provisional signatures over a communications network to a verifier. The verifier transmits a provisional signature over a communications network to a server. Subsequently, the verifier receives a final signature from the server and verifies the resulting final signature. The server converts the provisional signature to a final signature and transmits the final signature over a communications network to the verifier.

Figure 3:
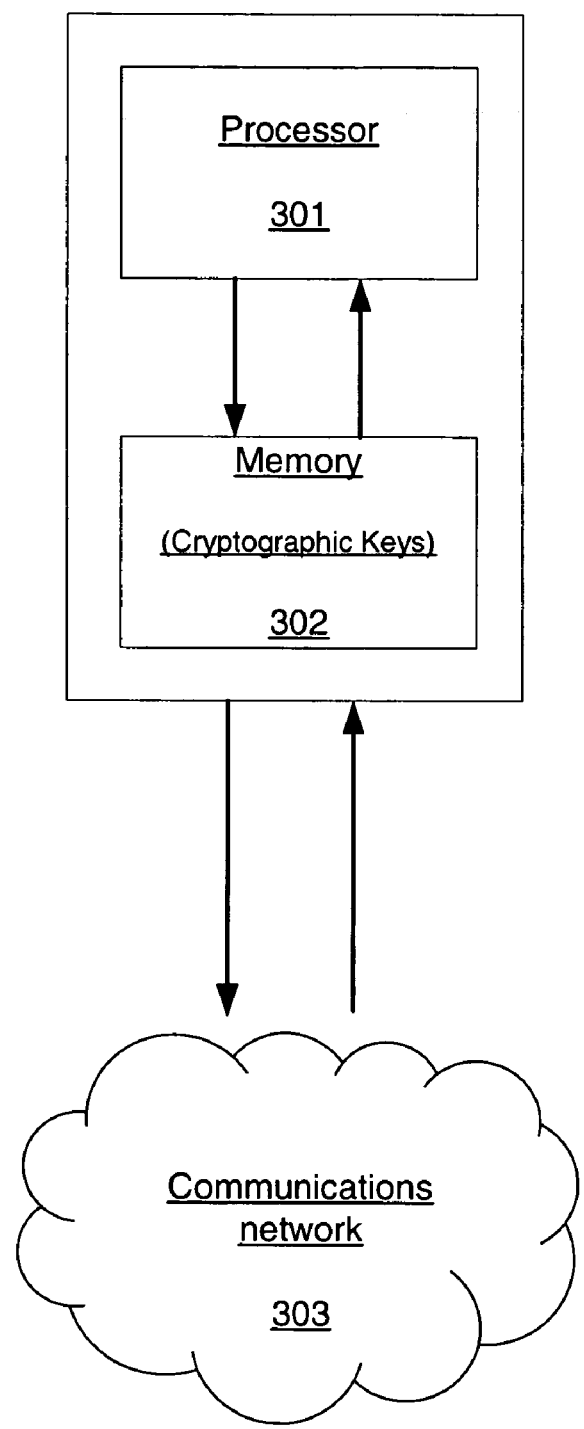
FIG. 3 illustrates of one embodiment of a signer, server, or verifier component.

Each of the signer, verifier, and server comprise a component having processing logic that may comprise hardware (e.g., circuitry, dedicated logic, etc.), software apparatus (such as is run on a general purpose computer system or a dedicated machine), or a combination of both. FIG. 3 illustrates one embodiment of such a component. Referring to FIG. 3, component 300 includes a processor 301, memory 302 and a network interface 303. Processor 301 is coupled to memory 302 and network interface 303.

The signer includes processor logic 301 with processing logic to receive a message through an external network interface 303 and apply a method to create provisional signatures to thereby obtain a provisional signature on the message.

The verifier includes processor 301 with processing logic to receive a message and a final signature through an external network interface 303 and to apply a method for verifying signatures to thereby obtain assurance that the message originated with the indicated signer.

The server includes processor 301 with processing logic to transmit to network 304 the output given by a method for converting a provisional signature received through an external network interface 303 as an input as part of a network request into a final signature.

Figure 5:
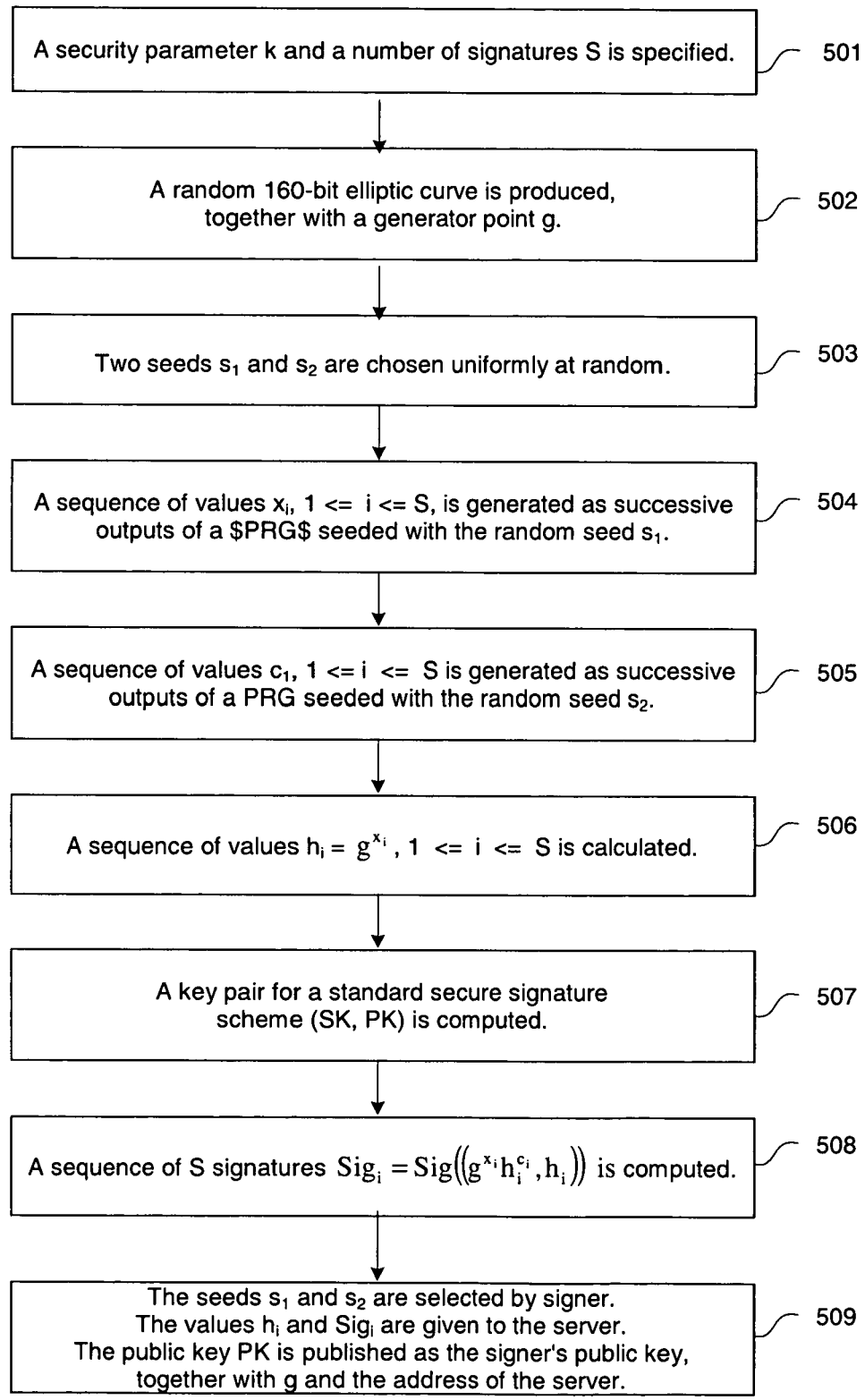
FIG. 5 is a flow diagram of one embodiment of a process for server assisted key generation.

FIG. 5 is a flow diagram of one embodiment of a process for a key generation for a server assisted digital signature technique. The process may be performed by processing logic that may comprise hardware (e.g., circuitry, dedicated logic, etc.), software (such as is run on a general purpose computer system or a dedicated machine), or a combination of both. In one embodiment, key generation is performed by the signer.

Referring to FIG. 5, the process begins by processing logic specifying a security parameter k and a number of signatures S (processing block 501). Next, processing logic produces a random 160-bit elliptic curve, together with a generator point g (processing block 502). There are standard techniques for selecting a generator. For example, one approach is to pick a random element and see if it happens to be a valid generator. In one embodiment, this curve and generator are used for all entities in the system. For purposes herein, and as a break with convention, a group of points over an elliptic curve is notated as a multiplicative group; it will be apparent to one of ordinary skill in the art how to transfer such notation to the standard additive notation. Note that other elliptic curves could be used (e.g., a 161-bit elliptic curve, as well as a 1024-bit finite field. In general, the scheme could use any algebraic group in which the discrete logarithm is hard, and the generator g should come from that group.

After the curve and generator are produced, processing block chooses uniformly two seeds s1 and s2 at random (processing block 503). Next, processing logic generates a sequence of values $x_i$, where $1 \leq i \leq S$ as successive outputs of a PRG seeded with the random seed $s_1$ (processing block 504) and generates another sequence of values $c_i$, $1 \leq i \leq S$ as successive outputs of a PRG seeded with the random seed $s_2$ (processing block 505). Once the two sequences are generated, processing logic calculates a sequence of values $h_i = g^{x_i}$, where $1 \leq i \leq S$ (processing block 506). Then, processing logic computes a key pair for a standard signature scheme (SK, PK) (processing block 507). The secret key SK is used to create a sequence of S signatures $Sig_i = Sig((g^{x_i} h_i^{c_i}, h_i))$.

Once the calculations have been completed, processing logic sends the seeds $s_1$ and $s_2$ to the signer (processing block 508) and sends the values $h_i$ and $Sig_i$ to the server (processing logic 509). Also, processing logic publishes the public key PK as the signer's public key, together with g and the address of the server.

Figure 6:
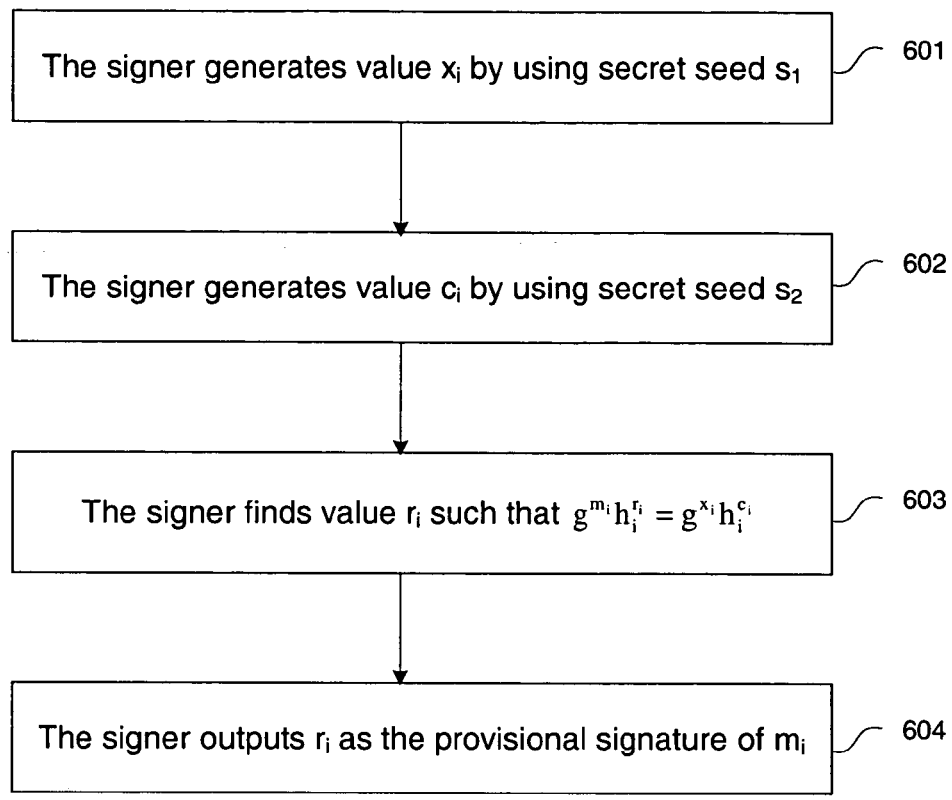
FIG. 6 is a flow diagram of one embodiment of a process for provisional signing in a server assisted key generation scheme.

FIG. 6 is a flow diagram of one embodiment of a process for generating a provisional signature for use in a server assisted signature scheme. The process may be performed by processing logic that may comprise hardware (e.g., circuitry, dedicated logic, etc.), software (such as is run on a general purpose computer system or a dedicated machine), or a combination of both. In one embodiment, the processing logic is a part of the signer.

Referring to FIG. 6, the process begins by processing logic generating the value $x_i$ by using its secret seed $s_1$ (processing block 601) and generates the value $c_i$ by using its secret seed $s_2$ (processing block 602). Next, processing logic finds an $r_i$ such that that $g^{m_i}h_i^{r_i}=g^{x_i}h_i^{c_i}$ (processing block 603) and outputs $r_i$ as the provisional signature of message $m_i$ (processing block 604).

Figure 7:
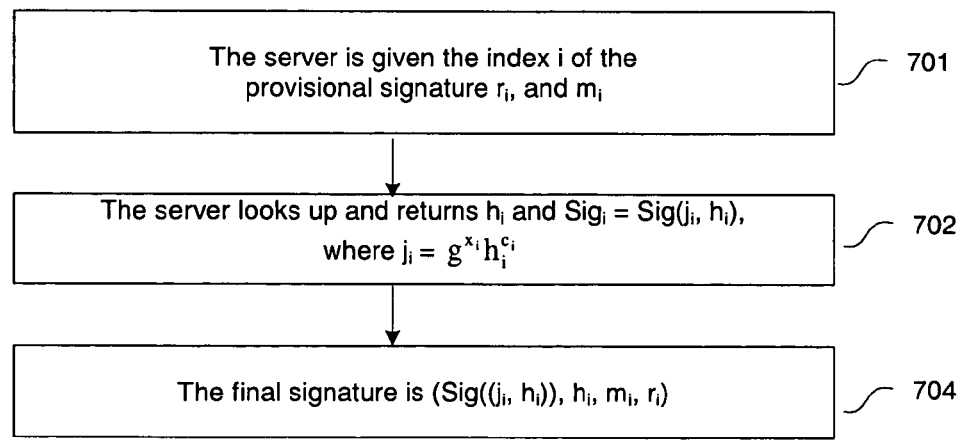
FIG. 7 is flow diagram of one embodiment of a process for completing a provisional signature in a server-assisted signature scheme.

FIG. 7 is a flow diagram of one embodiment of a process for completing a provisional signature for a server assisted signature scheme. The process may be performed by processing logic that may comprise hardware (e.g., circuitry, dedicated logic, etc.), software (such as is run on a general purpose computer system or a dedicated machine), or a combination of both. In one embodiment, the processing logic is part of the server.

Referring to FIG. 7, the process begins by processing logic receiving the index i of the provisional signature $r_i$ (processing block 701). Next, processing logic looks up and returns the corresponding values of the sequence of signatures $Sig_i=Sig((g^{x_i}h_i^{c_i}h_i))$ and $h_i$ (processing block 702) and outputs the final signature $(Sig((g^{x_i}h_i^{c_i},h_i)),h_i,m_i,r_i)$ (processing block 703).

Figure 8:
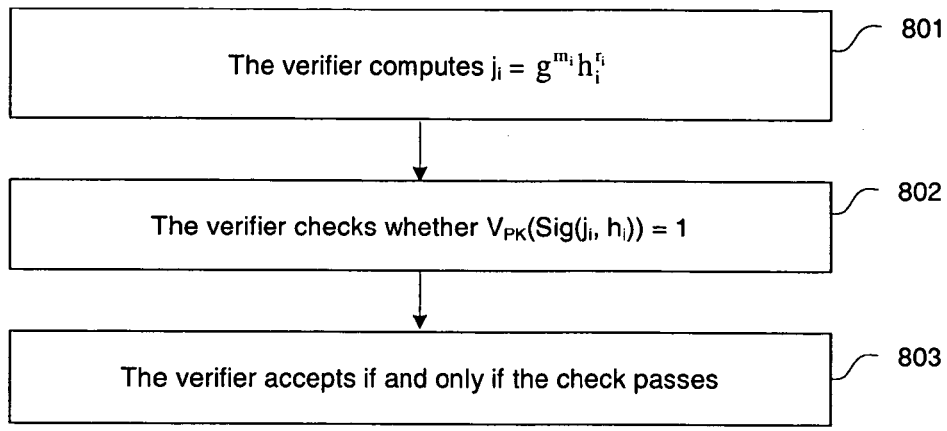
FIG. 8 is a flow diagram of one embodiment of a process for verifying a final signature in a server-assisted signature scheme.

FIG. 8 is a flow diagram of one embodiment of a process for verifying a final signature for a server assisted signature scheme. The process may be performed by processing logic that may comprise hardware (e.g., circuitry, dedicated logic, etc.), software (such as is run on a general purpose computer system or a dedicated machine), or a combination of both. In one embodiment, the processing logic is part of the verifier.

Referring to FIG. 8, the process begins by processing logic computing $g^{m_i}h_i^{r_i}$ (processing block 801) and verifying the signatures by checking $V_{PK}(Sig(g_i h_i))=1$ (processing block 802). Next, processing logic accepts the signature as valid if and only if the check passes (processing block 803).

Alternatively, the server assisted signature scheme may be viewed a server-assisted one-time signature scheme by using the "hash-sign-switch paradigm" to transform any underlying signature scheme secure against existential forgery under chosen message attack. It is assumed that an existing signature scheme (Gen, Sig, Ver) is secure against existential forgery under adaptive chosen message attack and that S signatures in total are to be signed.

1. Key Generation: First generate a key pair $PK_{sig}$ and $SK_{sig}$ for the underlying signature scheme. Then, using a PRG with seed $s_1$, generate a sequence of chameleon hash key pairs $(SK_{ch}^i, PK_{ch}^i)$ for i from 1 to S. Finally, using PRG with seeds $s_2$ and $s_3$, generate two sequences of pseudo-random values $v_1, \ldots, v_S$ and $w_1, \ldots, w_S$. The variable $c_i$ is defined such that $c_i=CH_i(w_i, v_i)$—i.e., the chameleon hash of $(w_i, v_i)$ under the chameleon hash key $PK_{ch}^i$. $SK_{prov}$ consists of the seeds $s_1$ and $s_2$, while $SK_{comp}$ consists of the values $PK_{ch}^i,Sig(c_i,PK_{ch}^i)$. The public key PK consists of $PK_{sig}$ and the address of the server.

2. ProvSign: On input (M, i) for the next value i, compute $SK_{ch}^i$ using $s_1$, $v_i$ using $s_2$, and $w_i$ using $s_3$. Then compute $r_i$ such that $CH_i(M, r_i)=CH_i(v_i, w_i)$. Return $r_i$ as the provisional signature on M. Mark the value i as used.

3. Complete: On input (±, i), return $PK_{ch}^i$ and $Sig(c_i,PK_{ch}^i)$. The final signature is then (M, $r_i$, $PK_{ch}^i,Sig(c_i,PK_{ch}^i)$).

4. Verify: On input (M, $r_i$, $PK_{ch}^i,Sig(c_i,PK_{ch}^i)$), accept the signature as valid if and only if $Ver(Sig(CH_i(M,r_i),PK_{ch}^i)=1$ Note that the entire "secret key" for the Complete operation, $SK_{comp}$, can be revealed without enabling an adversary to forge final signatures. Therefore, a server in this server-assisted signature scheme may be aggressively replicated. Furthermore, the server performs no computation, but simply returns static, read-only values $PK_{ch}$ and $Sig(c, PK_{ch})$.

In one embodiment, the system for communicating data between signer, verifier, and server for performing server assisted digital signatures comprises a client component capable of creating provisional signatures, a server component capable of completing provisional signatures to yield final signatures, and a verifier component capable of verifying final signatures.

In one embodiment, each of the signer, verifier and the server of an implementation of a server assisted signature scheme may be a hardware apparatus (e.g., circuitry, dedicated logic, etc.), software apparatus (such as is run on a general purpose computer system or a dedicated machine), or a combination of both, capable of performing processing logic. Each of these components may be implemented as the component shown in FIG. 3. The server-assisted signer uses the external network interface to receive a request for a provisional signature and its processor, which is coupled to the external network interface and the memory, to create the provisional signature and return the provisional signature via the external network to the requesting party. The server assisted signature verifier component uses its external network interface to receive a final signature. The server assisted signature server component uses its external network interface to receive a provisional signature and its processor, which is coupled to the external network interface and the memory, to transmit to the network the completed final signature for a server assisted signature scheme.

In one embodiment of a server-assisted signature scheme, the chameleon function $CH(m, r)=g^x h^r$. In such a case, the signor storage need only store the seed s, which is 128 bits in length, and a counter, which is 20 bits in length, to represent the variable "i" used in the description below. Thus, the total signer storage is 148 bits, regardless of the number of signatures. Note that most previous public-key signature schemes, such as RSA, require much larger secret key sizes. With respect to signor computation, the signer evaluates the PRG a constant number of times to obtain $x_i$, and then performs $O(\log^2 q)$ operations to compute the provisional signature $r_i$, where q is the order of the group G. The signer need only communicate $r_i$, which is 160 bits. The server includes storage that, for each signature, stores $h_i$ and $Sig_i$. In this embodiment, the value $h_i$ is 160 bits, while by using an appropriately short signature scheme, $Sig_i$ can also be reduced to 320 bits or less. The server does not perform any on-line computation. Instead, the server simply retrieves the pair ($h_i$, $Sig_i$) and returns it to the verifier. As far as verifier computation is concerned, the verifier must perform one elliptic curve point multiplication, and one ordinary signature verification.

An Example of a Designated Confirmer Scheme

The process of creating a provisional signature and completing the provisional signature may be used for designated confirmer schemes. An example of such a scheme is given below.

Figure 9:
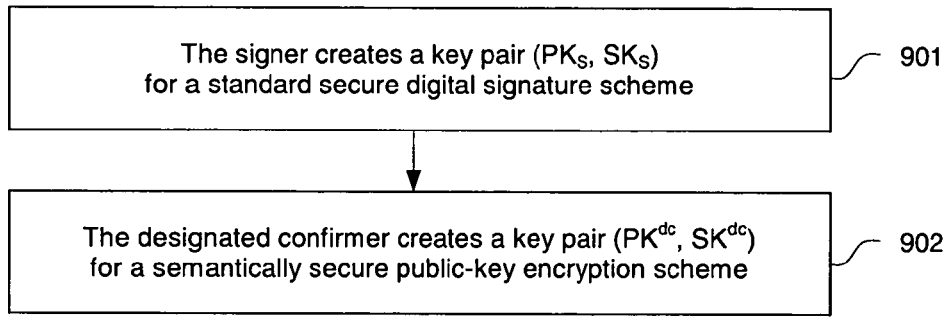
FIG. 9 is a flow diagram of one embodiment of a process generating keys for a designated confirmer signatures scheme.

FIG. 9 is a flow diagram of one embodiment of a process for generating a key for use in a designated confirmer signatures scheme. The process may be performed by processing logic that may comprise hardware (e.g., circuitry, dedicated logic, etc.), software (such as is run on a general purpose computer system or a dedicated machine), or a combination of both. In one embodiment, the processing logic is part of a signer or designated confirmer.

Referring to FIG. 9, the process begins by processing logic creating a key pair $PK_S$, $SK_S$ for a standard secure digital signature scheme (processing logic 901) and creating a key pair $PK_{dc}$, $SK_{dc}$ for a semantically secure public-key encryption scheme (processing block 902). This is done in a manner well-known in the art.

Figure 10:
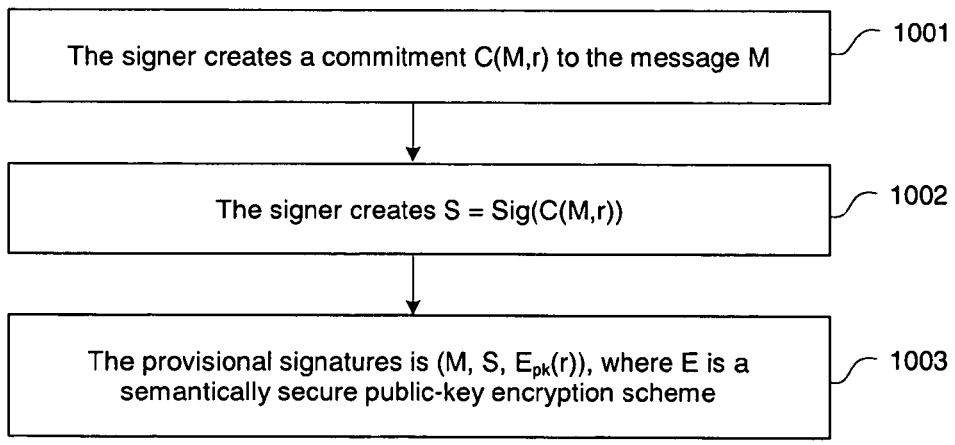
FIG. 10 is a flow diagram of one embodiment of a process for generating keys for a designated confirmer signature scheme.

FIG. 10 is a flow diagram of one embodiment of a process for generating a provisional signature for use with designated confirmer signature schemes. The process may be performed by processing logic that may comprise hardware (e.g., circuitry, dedicated logic, etc.), software (such as is run on a general purpose computer system or a dedicated machine), or a combination of both. In one embodiment, the processing logic is part of the signer.

Referring to FIG. 10, the process begins by processing logic creating a commitment C(M, r) to the message M (processing block 1001) and signing the commitment S=Sig(C (M, r)) (processing block 1002). Next, processing logic outputs the provisional signature (M, S, $E_{PK}(r)$), where E is a semantically secure public-key encryption scheme (processing block 1003).

FIG. 11 is a flow diagram of one embodiment of a process for confirming a provisional signature in a designated confirmer signature scheme. The process may be performed by processing logic that may comprise hardware (e.g., circuitry, dedicated logic, etc.), software (such as is run on a general purpose computer system or a dedicated machine), or a combination of both. In one embodiment, the processing logic is part of the designated confirmer.

Referring to FIG. 11, the process begins by processing logic performing a zero-knowledge proof of knowledge of a value r, such that comm=C(M,r) where comm is a variable corresponding to the commitment corresponding to provisional signatures and M is the message that the signer has allegedly signed (processing block 1101).

FIG. 12 is a flow diagram of one embodiment of a process for disavowing a provisional signature for designated confirmer signatures scheme. The process may be performed by processing logic that may comprise hardware (e.g., circuitry, dedicated logic, etc.), software (such as is run on a general purpose computer system or a dedicated machine), or a combination of both. In one embodiment, the processing logic is part of the designated confirmer.

Referring to FIG. 12, the process begins by parsing the purported signature as (M,S,$E_{PK_{dc}}(r)$) (processing block 1201). Then, processing logic decrypts (M,S,$E_{PK_{dc}}(r)$) to recover r (processing block 1202). Finally, processing logic performs a zero-knowledge proof of knowledge of an r and an M' such that Ver(S)=1, C(M', r)=S, $D_{ch}(E_{ch}(r))$=r) and M'≠M (processing block 1203).

In an alternative embodiment, processing logic sends additional information to the verifier to convince the verifier (in zero-knowledge) that the claims message confirmer sends comm., S, and a zero knowledge proof of knowledge of an r such that comm=C(M,r), where M is the message that the signer has allegedly signed. To verify that M was signed, the verifier checks the zero knowledge proof, and checks that S is a valid signature on comm.

FIG. 13 is a flow diagram of one embodiment of a process for completing a provisional signature in a designated confirmer signature scheme. The process may be performed by processing logic that may comprise hardware (e.g., circuitry, dedicated logic, etc.), software (such as is run on a general purpose computer system or a dedicated machine), or a combination of both. In one embodiment, the processing logic is part of the designated confirmer.

Referring to FIG. 13, the process begins by processing logic decrypting $E_{pk}(r)$ to obtain r (processing block 1301). Next, processing logic outputs (M, r, S) as the final signature on M (processing block 1302).

Figure 14:
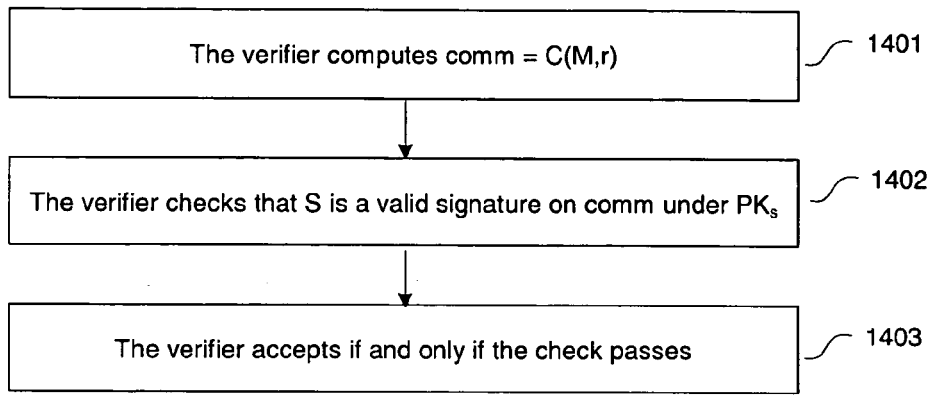
FIG. 14 is a flow diagram of one embodiment of a process for verification of final signature for a designated confirmer signature scheme.

FIG. 14 is a flow diagram of one embodiment of a process for verifying a final signature in a designated confirmer signature scheme. The process may be performed by processing logic that may comprise hardware (e.g., circuitry, dedicated logic, etc.), software (such as is run on a general purpose computer system or a dedicated machine), or a combination of both. In one embodiment, the processing logic is part of the verifier.

Referring to FIG. 14, the process begins by processing logic computes the variable comm equal to C(M, r) (processing block 1401) and checks that S is a valid signature under $PK_s$, which is the public key of the signature scheme (processing block 1402). Then, processing logic accepts if and only if the check passes (processing block 1403).

In one embodiment, a system for communicating data between signer, verifier, and server for performing designated confirmer digital signatures includes a client component capable of creating provisional signatures, a server component capable of completing provisional signatures to yield final signatures, and a verifier component capable of verifying final signatures.

In one embodiment, each of the signer, verifier and the server in one embodiment of an implementation of a designated confirmer signature scheme may be a hardware apparatus (e.g., circuitry, dedicated logic, etc.), software apparatus (such as is run on a general purpose computer system or a dedicated machine), or a combination of both, capable of performing processing logic. Each of these components may be implemented as the component shown in FIG. 3. The designated confirmer signer uses the external network interface to receive a request for a provisional signature and its processor, which is coupled to the external network interface and the memory, to create the provisional signature and return the provisional signature via the external network to the requesting party. The designated confirmer signature verifier component uses its external network interface to receive a final signature. The designated confirmer signature server component uses its external network interface to receive a provisional signature and its processor, which is coupled to the external network interface and the memory, to transmit to the network the completed final signature for a designated confirmer signature scheme.

Efficiently Realizing the Transformation

Using the transformation described herein, the step that may be the most difficult step to perform efficiently is the disavow protocol and the resulting zero-knowledge proof because it simply relies on the fact that "this designated confirmer signature is invalid" is an NP-statement that can be proven in zero knowledge.

Interestingly, the possibility that the ciphertext contained in the designated confirmer signature is not well-formed can be eliminated by making some assumptions about the underlying encryption scheme. For example, that a cryptosystem whose outputs is ciphertext-dense if all but a negligible fraction of bit-strings are valid ciphertexts. If the disavow protocol is run with a ciphertext-dense cryptosystem, the bitstring is an invalid ciphertext does not need to be proved.

In one embodiment, a ciphertext-dense public-key encryption scheme is constructed from any trapdoor permutation family as follows. Let the public key be f: $\{0,1\}^k \rightarrow \{0,1\}^k$ and the private key be the inverse $f^{-1}$. To encrypt a single bit b, pick $x,r \leftarrow_R \{0,1\}^k$. The ciphertext is then $(f(x), r, GL(x, r) \oplus b)$, where GL is the Goldreich-Levin predicate. It is easy to see that an adversary breaking the semantic security of the scheme is a predictor for the Goldreich-Levin predicate, and so would contradict the one-wayness of f. Further, the symbol "," means concatenation, every string of 2k+1 bits is a valid ciphertext. Alternatively, an encryption scheme can be used that provides randomness recovery. That is, given an encryption $E_{pk}(m)$ which used randomness r, the decryption includes the randomness r as well as m.

Efficient Instantiations Based on the N-th Residuousity Assumption

Essentially, Paillier encryption, which is well-known in the art, works as follows. The recipient chooses a composite modulus N, whose factorization it keeps secret. The recipient also publishes a number $g \in Z/N^2Z$ that generates a "sufficiently large" group modulo $N^2$—e.g., a group of order $N\phi(N)/2$. To encrypt m satisfying $0 \leq m \leq N$, the sender chooses a random $r \in Z/N^2Z$ and sets the ciphertext $c=r^N g^m$ (mod $N^2$). To decrypt, the recipient essentially computes $m=\log_g c \pmod N$. Paillier encryption is semantically secure assuming the decisional N-th residuosity problem is hard.

In one embodiment, an efficient designated confirm signature scheme is constructed using any underlying signature scheme, in conjunction with semantically secure Paillier encryption, as follows.

1) Key Generation: The signer creates a key pair ($PK_S$; $SK_S$) for any standard secure digital signature scheme. The designated confirmer generates a Paillier modulus N and a suitable generator g modulo $N^2$. It also generates a certificate proving that N has the correct form. Finally, the designated confirmer may also provide the description of a second group $G_2$ and a generator $g_2 \in G_2$ that has order N.

2) ProvSign(M):

a) The signer creates a commitment to the message m by generating a random $h_2 \in G_2$ and a random $r \in Z/NZ$, computing $c=g_2^r h_2^m \in G_2$.

b) The signer creates $S=Sig(c, h_2)$.

c) The signer creates a Paillier encryption of $r \in Z/NZ$ by generating a random $a \in Z/NZ$ setting $r'=r+aN$, and setting $E_N(r)=g^{r'} \pmod{N^2}$.

d) The provisional signature is $(m, S, c, h_2, E_N(r))$.

3) Confirm by Signer: The signer proves that its designated confirmer signature is correctly constructed by providing a zero-knowledge proof of knowledge of an r and an a such that $E_N(r)=g^r(g^N)^a \pmod{N^2}$ and $c/h_2^m=g_2^r$. This can be performed using standard techniques. Since the designated confirmer can recover r'(mod N) through Paillier decryption, and since r'(mod N) completely reveals $\log_{g2}(c/h_2^m)$ (since $G_2$ has order N), the verifier is convinced by this zero knowledge proof of knowledge that the designated confirmer can "extract" a conventional signature $(m, S, h_2, r)$ from the designated confirmer signature. Notice that the proof of knowledge can be very efficiently implemented.

4) Confirm by Designated Confirmer: To confirm, the designated confirm simply provides the provisional signature and a zero knowledge proof of knowledge of $r=\log_{g2}(c/h_2^m)$. It can easily recover r from the Paillier ciphertext.

5) Disavow: If the designated confirmer signature is badly formed, either S is not a valid signature on $(c, h_2)$ (which is easily verifiable), or that $c/h_2^m \neq g_2^{D_N(E_N(r))}$. In other words, if we set $c'=c/h_2^m$, it must be the case that $\log_{g2} c' \neq \log(E_N(r)) \pmod N$. To prove that this inequality holds, the designated confirmer first recovers $d=\log_g(E_N(r)) \pmod N$ using Paillier decryption. If $x=\phi(N)$ and $y=d\phi(N)$, then $E_N(r)^x=g^y \pmod{N^2}$, but $c'^x \neq g_2^y$. The designated confirmer can provide a zero knowledge proof of knowledge of these x and y using fairly standard techniques. In particular, one can construct the usual three-round zero knowledge proof by 1) having the confirmer choose values $u,v \in Z/NZ$ and sending $(A, B)=(E_N(r)^u g^v, c'^u g_2^v g^v)$ to the verifier, 2) having the verifier randomly choose a bit $b \in \{0,1\}$, 3) having the confirmer send back values $u',v' \in Z/NZ$ such that $E_N(r)^{u'} g^{v'}=c'^u g_2^v g_2^{v'}=B$ if b=0 or such that $E_N(r)^{u'} g^{v'}=A$ and $c'^{u'} g_2^{v'} \neq B$ if b=1. In the last step, the confirmer can generate such (u',v') by generating a random $0 \neq k \in Z/NZ$ and setting $u'=u+bkx \pmod N$ and $v'=v-bky \pmod N$.

The designated confirmer, since it decrypt the value of r, converts the designated confirmer signature into an "ordinary" signature that can be verified by anyone; this ordinary signature consists of $(m, S, h_2, r)$, and a verifier checks that S is a valid signature on $(c,h_2)$ for $c=g_2^r h_2^m$. However, to prove the confirmer's security—i.e., to prove that malicious adversaries that interact with the designated confirmer will be unable to eventually usurp the role of the confirmer and gain the ability to convert designated confirmer signatures into signatures verifiable by everyone—a semantically secure version of Paillier encryption does not seem to be sufficient.

However, it is a relatively simple matter to replace the semantically secure version above with an IND-CCA2 secure version of Paillier encryption described by Camenisch and Shoup. The zero knowledge proofs are essentially the same. The main difference is that, since the encryption scheme is IND-CCA2 secure, the confirmer can securely reveal the decryption of ciphertexts chosen by malicious adversaries, and thus can securely extract an ordinary signature from a designated confirmer signature as described above.

An Example of a Blind Signature Scheme

Figure 15:
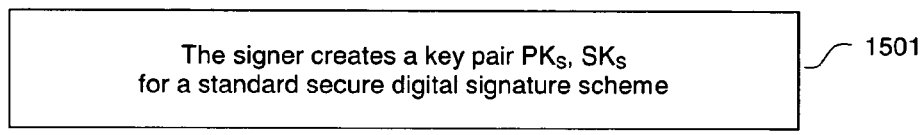
FIG. 15 is a flow diagram of one embodiment of a process for a key generation for blind signature scheme.

FIG. 15 is a flow diagram of one embodiment of a process for generating a key for a blind signatures scheme. The process may be performed by processing logic that may comprise hardware (e.g., circuitry, dedicated logic, etc.), software (such as is run on a general purpose computer system or a dedicated machine), or a combination of both. In one embodiment, the processing logic is part of the signer.

Referring to FIG. 15, the process begins by processing logic creating a key pair $PK_S$, $SK_S$ for a standard secure digital signature scheme (processing block 1501).

Figure 16:
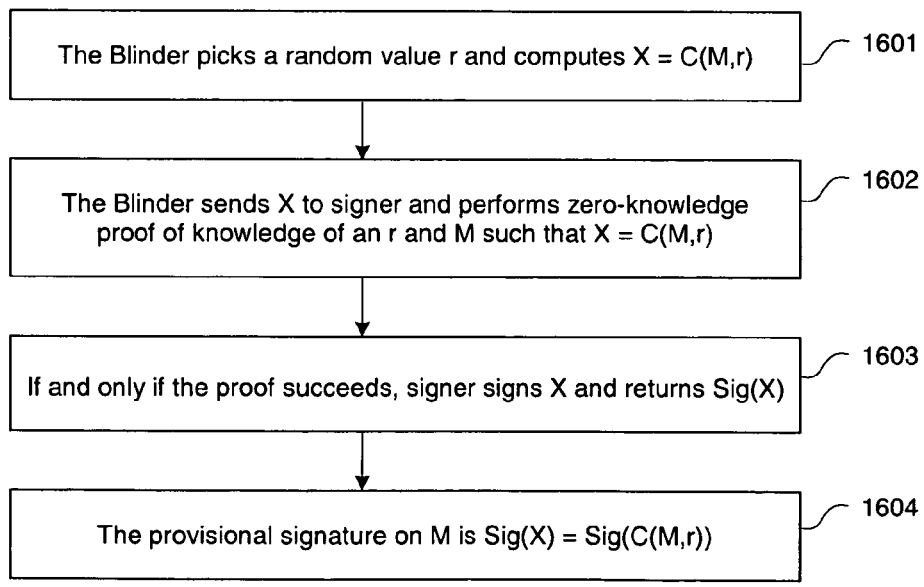
FIG. 16 is a flow diagram of one embodiment of a process for provisional generation for a blind signature scheme.

FIG. 16 is a flow diagram of one embodiment of a process for generating a provisional signature for a blind signature scheme. The process is performed by processing logic that may comprise hardware (e.g., circuitry, dedicated logic, etc.), software (such as is run on a general purpose computer system or a dedicated machine), or a combination of both. In one embodiment, the processing logic is part of the blinder or signer.

Referring to FIG. 16, the process begins by processing logic picking a random value r and computes X=C(M, r) (processing block 1601). Next, processing logic sends X to the signer and performs a zero-knowledge proof of knowledge of an r and M such that X=C(M,r) (processing block 1602). If and only if the proof succeeds, then processing logic signs X and returns Sig(X) (processing block 1603) and outputs the provisional signature on M as Sig(X)=Sig(C(M, r)) (processing block 1604).

Figure 17:
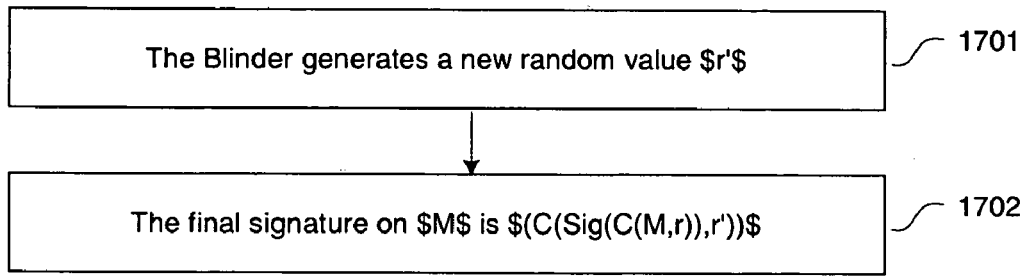
FIG. 17 is a flow diagram of one embodiment of a process for completion of a blind signature.

FIG. 17 is a flow diagram of one embodiment of a process for completing provisional signature for a blind signature scheme. The process may be performed by processing logic that may comprise hardware (e.g., circuitry, dedicated logic, etc.), software (such as is run on a general purpose computer system or a dedicated machine), or a combination of both. In one embodiment, the processing logic is part of the blinder.

Referring to FIG. 17, the process begins by processing logic generating a new random value r' (processing block 1701). Next, processing block begins by processing logic outputting the final signature on M as (C(Sig(C(M, r)), r')) (processing block 1702).

Figure 18:
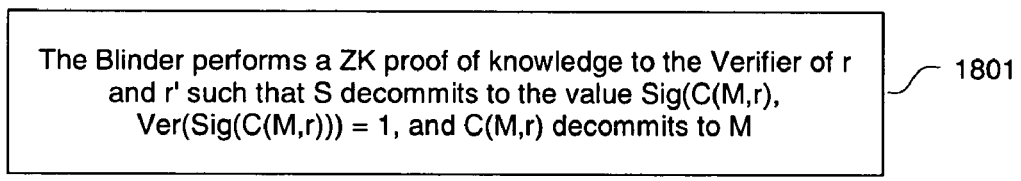
FIG. 18 is a flow diagram of one embodiment of a process for verification of a blind signature.

FIG. 18 is a flow diagram of one embodiment of a process for verifying a final signature for a blind signature scheme. The process may be performed by processing logic that may comprise hardware (e.g., circuitry, dedicated logic, etc.), software (such as is run on a general purpose computer system or a dedicated machine), or a combination of both. In one embodiment, the processing logic is part of the blinder or a signer.

Referring to FIG. 18, the process begins by processing logic performing a ZK proof of knowledge to the Verifier of r and r' such that S decommits to the value Sig(C(M, r), Ver (Sig(C(M, r)))=1, and C(M, r) decommits to M (processing block 1801).

The above interactive proof can be rendered non-interactive using random oracles via the "Fiat-Shamir heuristic."

Figure 19:
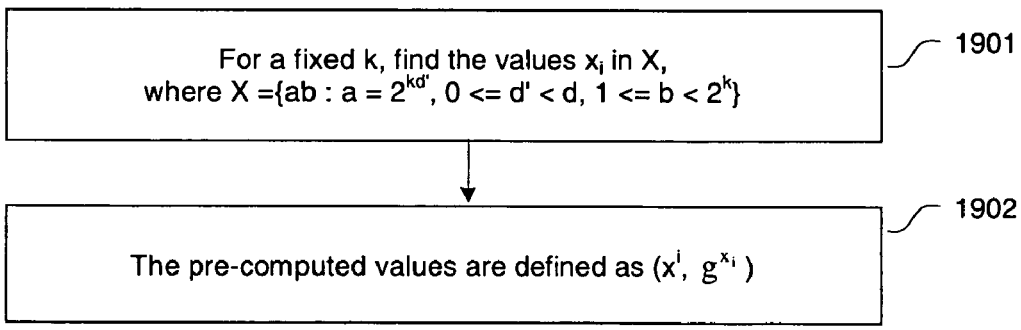
FIG. 19 is a flow diagram of one embodiment of a process for pre-computating a chameleon hash function.

FIG. 19 is a flow diagram of one embodiment of a process for generating pre-computed values for verification of a chameleon hash function. The process may be performed by processing logic that may comprise hardware (e.g., circuitry, dedicated logic, etc.), software (such as is run on a general purpose computer system or a dedicated machine), or a combination of both. In one embodiment, the processing logic is part of the blinder or signer.

The problem may be set forth as given (G, g, y, x), where G is a group of order q, where g, y∈G, and x∈[1, q], prove that $g^x = y$ in G. Suppose, for convenience, that d log $q(c_{max}+1)$ e=kd for some integer d, where $c_{max}$ is the maximum value the challenge c can take, and where k is the integer parameter mentioned above.

Referring to FIG. 19, the process begins by processing logic, for a fixed k, finding the values $x_i \in X$, where X={ab: $a=2^{kd'}$, $0 \leq d' < d$, $1 \leq b < 2^k$} (processing block 1901). Thereafter, processing logic defines pre-computed values are defined as $(x_i, g^{x_i})$ (processing block 1902).

Figure 20:
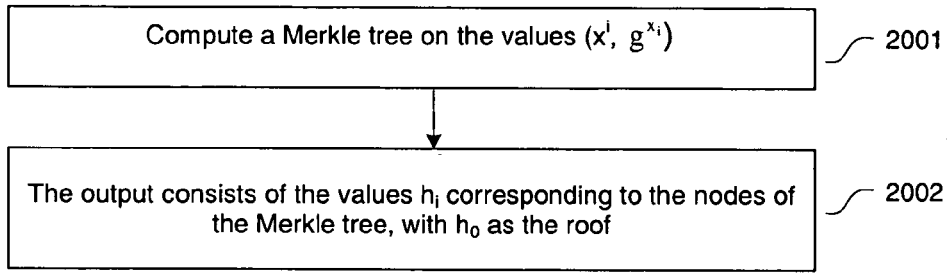
FIG. 20 is a flow diagram of one embodiment of a process for certifying pre-computed values for verification of a chameleon hash function.

FIG. 20 is a flow diagram of one embodiment of a process for certifying pre-computed values for verification of a chameleon hash function. The process may be performed by processing logic that may comprise hardware (e.g., circuitry, dedicated logic, etc.), software (such as is run on a general purpose computer system or a dedicated machine), or a combination of both.

Referring to FIG. 20, the process begins by processing logic computing a Merkle tree on the values $(x_i, g^{x_i})$ (processing block 2001). Next, processing logic outputs the output consists of the values $h_i$ corresponding to the nodes of the Merkle tree, with $h_0$ as the root (processing block 2002).

Figure 21:
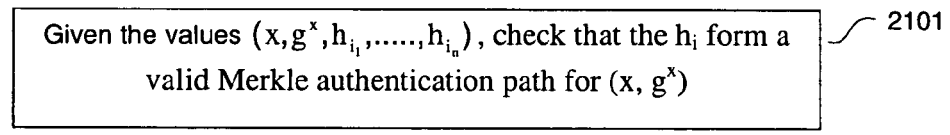
FIG. 21 is a flow diagram of one embodiment of a process for verifying pre-computed values for verification of a chameleon hash function.

FIG. 21 is a flow diagram of one embodiment of a process for verifying pre-computed values for verification of a chameleon hash function. The process may be performed by processing logic that may comprise hardware (e.g., circuitry, dedicated logic, etc.), software (such as is run on a general purpose computer system or a dedicated machine), or a combination of both. In one embodiment, the processing logic is the blinder or signer.

Referring to FIG. 21, processing logic gives the values $(x, g^x, h_{i_1}, \ldots, h_{i_n})$, and checks that the $h_i$ form a valid authentication path for $(x, g^x)$ (processing block 2101).

Figure 22:
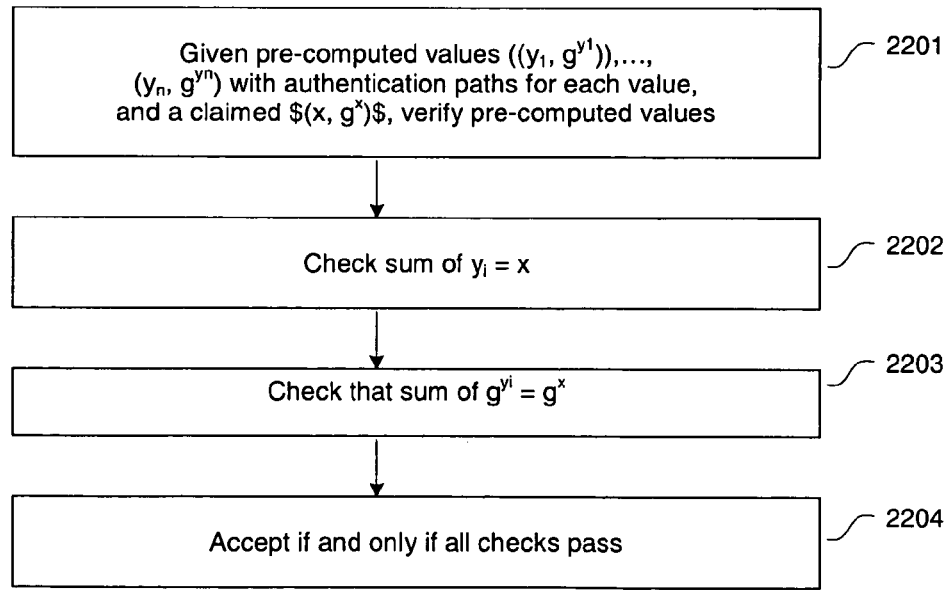
FIG. 22 is a flow diagram of one embodiment of a process for checking a chameleon hash using pre-computed values for verification of the chameleon hash function.

FIG. 22 is a flow diagram of one embodiment of a process for checking a chameleon hash using pre-computed values for verification of a chameleon hash function. The process may be performed by processing logic that may comprise hardware (e.g., circuitry, dedicated logic, etc.), software (such as is run on a general purpose computer system or a dedicated machine), or a combination of both.

Referring to FIG. 22, the process begins by processing logic giving pre-computed values $((y1, g^{y1}), \ldots, (y_n, g^{y_n}))$ with authentication paths for each value, and a claimed $(x, g^x)$, and verifies pre-computed values (processing block 2201). Next, processing logic checks $$\Sigma y_i = x$$

(processing block 2202). Thereafter, processing logic checks that $$\Sigma g^{y_i} = g^x$$

(processing block 2203). Processing logic accepts the chameleon hash function if and only if all checks pass (processing block 2204).

In one embodiment, the system for communicating data between signer, verifier, and server includes a client component capable of creating provisional signatures, a server component capable of completing provisional signatures to yield final signatures, and a verifier component capable of verifying final signatures.

In one embodiment, each of the signer, verifier and the server of an implementation of a blind signature scheme may be a hardware apparatus (e.g., circuitry, dedicated logic, etc.), software apparatus (such as is run on a general purpose computer system or a dedicated machine), or a combination of both, capable of performing processing logic. Each of these components may be implemented as the component shown in FIG. 3. The designated confirmer signer uses the external network interface to receive a request for a provisional signature and its processor, which is coupled to the external network interface and the memory, to create the provisional signature and return the provisional signature via the external network to the requesting party. The blind signature verifier component uses its external network interface to receive a final signature. The blind signature server component uses its external network interface to receive a provisional signature and its processor, which is coupled to the external network interface and the memory, to transmit to the network the completed final signature for a blind signature scheme.

An Exemplary Computer System

Figure 4:
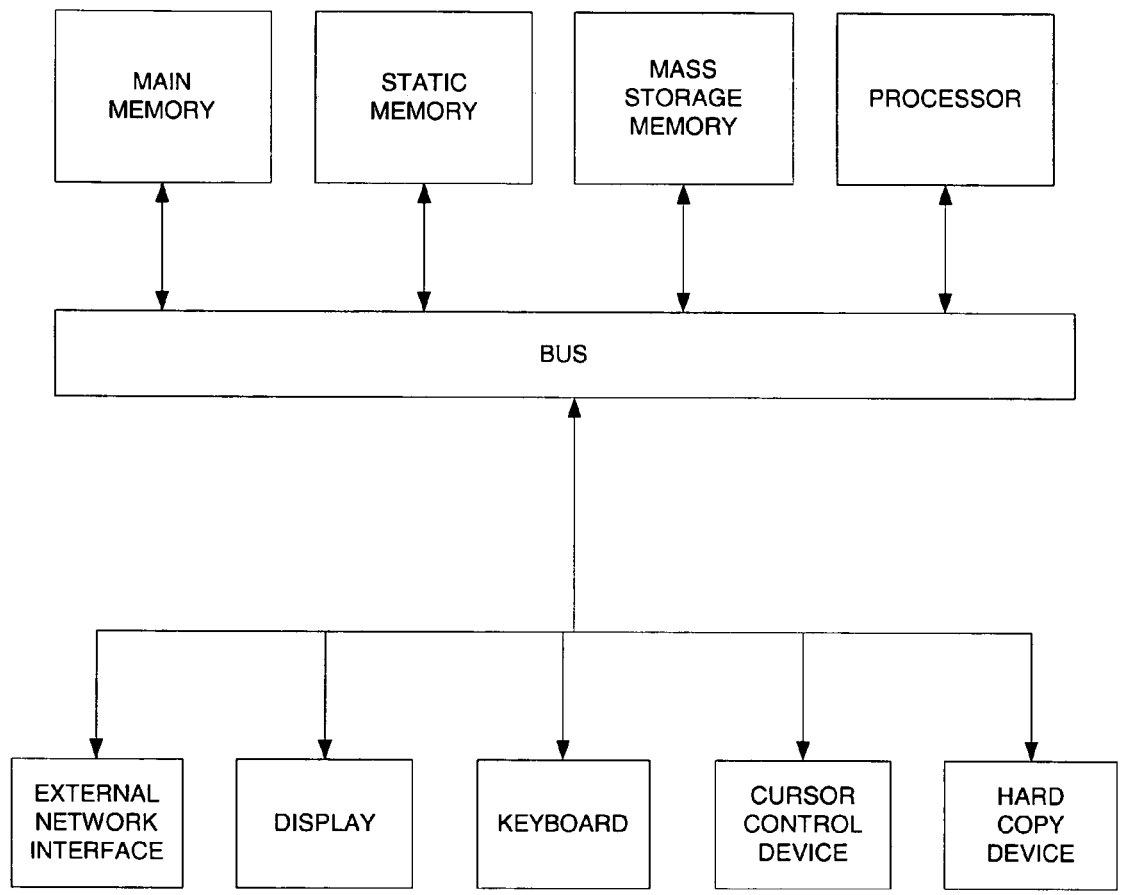
FIG. 4 illustrates an exemplary computer system.

FIG. 4 is a block diagram of an exemplary computer system that may perform one or more of the operations described herein. Referring to FIG. 4, the computer system may comprise an exemplary client or server computer system. The computer system comprises a communication mechanism or bus for communicating information, and a processor coupled with a bus for processing information. The processor includes a microprocessor, but is not limited to a microprocessor, such as, for example, Pentium, PowerPC, Alpha, etc.

The system further comprises a random access memory (RAM), or other dynamic storage device (referred to as main memory) coupled to the bus for storing information and instructions to be executed by the processor. Main memory also may be used for storing temporary variables or other intermediate information during execution of instructions by the processor.

The computer system also comprises a read only memory (ROM) and/or other static storage device coupled to the bus for storing static information and instructions for the processor, and a data storage device, such as a magnetic disk or optical disk and its corresponding disk drive. The data storage device is coupled to the bus for storing information and instructions.

The computer system may further be coupled to a display device, such as a cathode ray tube (CRT) or liquid crystal display (LCD), coupled to the bus for displaying information to a computer user. An alphanumeric input device, including alphanumeric and other keys, may also be coupled to the bus for communicating information and command selections to the processor. An additional user input device is cursor control, such as a mouse, trackball, trackpad, stylus, or cursor direction keys, coupled to the bus for communicating direction information and command selections to the processor, and for controlling cursor movement on the display.

Another device that may be coupled to the bus is a hard copy device, which may be used for printing instructions, data, or other information on a medium such as paper, film, or similar types of media. Furthermore, a sound recording and playback device, such as a speaker and/or microphone may optionally be coupled to the bus for audio interfacing with the computer system. Another device that may be coupled to the bus is a wired/wireless communication capability to communication to a phone or handheld palm device.

Note that any or all of the components of the system and associated hardware may be used in the present invention. However, it can be appreciated that other configurations of the computer system may include some or all of the devices. Whereas many alterations and modifications of the present invention will no doubt become apparent to a person of ordinary skill in the art after having read the foregoing description, it is to be understood that any particular embodiment shown and described by way of illustration is in no way intended to be considered limiting.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   computing, by a computer system, a signature based on a first secret seed and a second secret seed, where computing the signature comprises
      generating a first value $x_i$ using the first secret seed,
      generating a second value $c_i$ using the second secret seed, and
      computing the signature $Sig_i=Sig((g^{x_i}h_i^{c_i},h_i))$, where g is a generator point, $h_i$ is a value derived from $g^{x_i}$, and
      providing the signature $Sig_i$ and $h_i$ to a server;
   subsequent to computing the signature $Sig_i$, creating, by the computer system, a provisional signature by performing an operation on a message, wherein creating the provisional signature comprises
      identifying a third value $r_i$ that satisfies the following
         $$g^{m_i}h_i^{r_i}=g^{x_i}h_i^{c_i},$$
      where $m_i$ is the message; and
   outputting, by the computer system, the third value $r_i$ as the provisional signature to cause the server to complete the provisional signature and to thereby create a final signature $(Sig_i, h_i, m_i, r_i)$ on the message.

2. The method defined in claim 1 wherein completing the provisional signature comprises:
   receiving an index i of the provisional signature;
   obtaining corresponding values $Sig_i=Sig((g^{x_i}h_i^{c_i},h_i))$ and $h_i$ in response to the index i; and
   outputting the final signature $(Sig((g^{x_i}h_i^{c_i},h_i)),h_i,m_i,r_i)$, where $m_i$ is the message and $r_i$ is the provisional signature.

3. The method defined in claim 1 further comprising verifying the final signature.

4. The method defined in claim 3 wherein verifying the final signature comprises;
   computing $g^{m_i}h_i^{r_i}$;
   checking $VPK(Sig(g^{x_i}h_i^{c_i},h_i))=1$; and
   accepting the final signature in responsive to checking $VPK(Sig(g^{x_i}h_i^{c_i},h_i))=1$ occurs.

5. An apparatus comprising:
   a processor to compute a signature by
      generating a first value $x_i$ using a first secret seed
      generating a second value $c_i$ using a second secret seed, and
      computing the signature $Sig_i=Sig((g^{x_i}h_i^{c_i},h_i))$, where g is a generator point, $h_i$ is a value derived from $g^{x_i}$, and
      providing the signature $Sig_i$ and $h_i$ to a server;
   the processor to subsequently generate a provisional signature by
      identifying a third value $r_i$ that satisfies the following $g^{m_i}h_i^{r_i}=g^{x_i}h_i^{c_i}$, where $m_i$ is the message, and
      outputting the third value $r_i$ as the provisional signature; and
   a network interface coupled to the processor to transmit the provisional signature to a server via a network to cause the server to complete the provisional signature and to thereby create a final signature $(Sig_i, h_i, m_i, r_i)$ on the message.

6. A method comprising:
   receiving and storing, by a processor, a signature $Sig_i$ and $h_i$ associated with an index i, where $Sig_i=Sig((g^{x_i}h_i^{c_i},h_i))$, g is a generator point, $h_i$ is a value derived from $g^{x_i}$, $x_i$ and $c_i$, are generated by a pseudo random number generator (PRG) using two different seeds;
   subsequently receiving, by the processor, a provisional signature $r_i$ on a message $m_i$;
   converting the provisional signature into a final signature by
      receiving the index i of the provisional signature,
      using the index i to look up corresponding values $Sig_i$ and $h_i$, and
      outputting the final signature $(Sig_i, h_i, m_i, r_i)$; and
   sending, by the processor, the final signature to a network location.

7. An apparatus comprising:
   data storage to store a signature $Sig_i$ and $h_i$ associated with an index i, where $Sig_i=Sig((g^{x_i}h_i^{c_i},h_i))$, g is a generator point, $h_i$ is a value derived from $g^{x_i}$, and $c_i$, are generated by a pseudo random number generator (PRG) using two different seeds;
   a network interface to receive the signature $Sig_i$ and $h_i$ for storage and subsequently receive a provisional signature $r_i$ on a message $m_i$; and
   a processor to convert the provisional signature into a final signature by
      receiving the index i of the provisional signature;
      using the index i to look up corresponding values $Sig_i$ and $h_i$; and
      outputting the final signature $(Sig_i, h_i, m_i, r_i)$, wherein the network interface sends the final signature to a network location.

* * * * *